United States Patent
Stiff et al.

[11] 3,788,048
[45] Jan. 29, 1974

[54] TRASH SEPARATOR FOR SUGAR CANE HARVESTERS

[75] Inventors: Rodney Allan Stiff; Keith Leonard Ruback, both of Bundaberg, Australia

[73] Assignee: Massey-Ferguson (Australia) Limited, Victoria, Australia

[22] Filed: June 30, 1971

[21] Appl. No.: 158,239

[30] Foreign Application Priority Data
July 16, 1970 Australia............................ 1877/70

[52] U.S. Cl.................... 55/406, 56/12.8, 209/250, 209/350, 209/393
[51] Int. Cl............................................. B01d 45/14
[58] Field of Search...................... 55/400–409; 209/250, 271, 252, 260, 247, 261, 350, 393; 56/12.8

[56] References Cited
UNITED STATES PATENTS

| | | | |
|---|---|---|---|
| 574,990 | 1/1897 | Griffin | 55/408 |
| 815,674 | 3/1906 | Bent | 55/403 |
| 3,058,720 | 10/1962 | Hart et al. | 55/408 |
| 3,651,622 | 3/1972 | Wisting | 55/404 |

FOREIGN PATENTS OR APPLICATIONS

| | | | |
|---|---|---|---|
| 1,203,718 | 8/1959 | France | 55/408 |
| 1,506,477 | 11/1967 | France | 56/12.8 |
| 754,262 | 8/1956 | Great Britain | 55/403 |
| 974,004 | 9/1950 | France | 209/250 |
| 189,657 | 12/1922 | Great Britain | 55/401 |

*Primary Examiner*—Bernard Nozick
*Attorney, Agent, or Firm*—Gerhardt, Greenlee & Farris

[57] ABSTRACT

A trash separation apparatus for a sugar cane harvester including an extractor fan for drawing light-weight material from an airborne stream of chopped cane, an outlet for air from the extractor fan, and a rotatable element to remove light-weight material from the air passing through the outlet. The extractor fan is mounted in a housing so as to draw air up through an airborne stream of chopped cane being conveyed through the housing by flipper rollers and to force the air through an outlet in the housing. Light-weight crop material is removed from the airborne stream of chopped cane by the air drawn through the airborne stream by the extractor fan. The light-weight crop material is removed from the air passing through the extractor fan by a rotatable wheel with a plurality of spokes. The spokes catch the light weight trash and throw it outwardly into trash discharge chutes.

3 Claims, 4 Drawing Figures

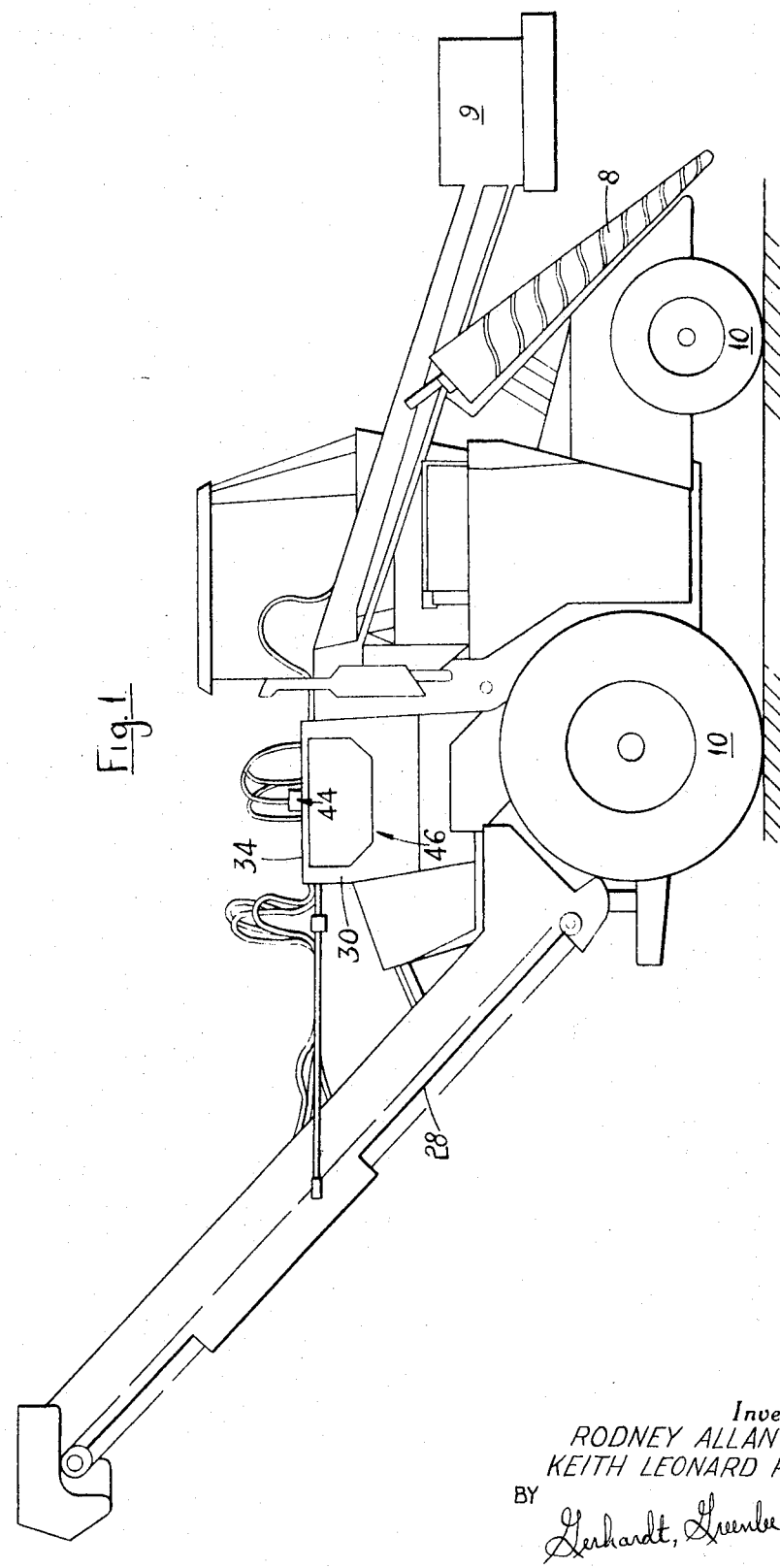

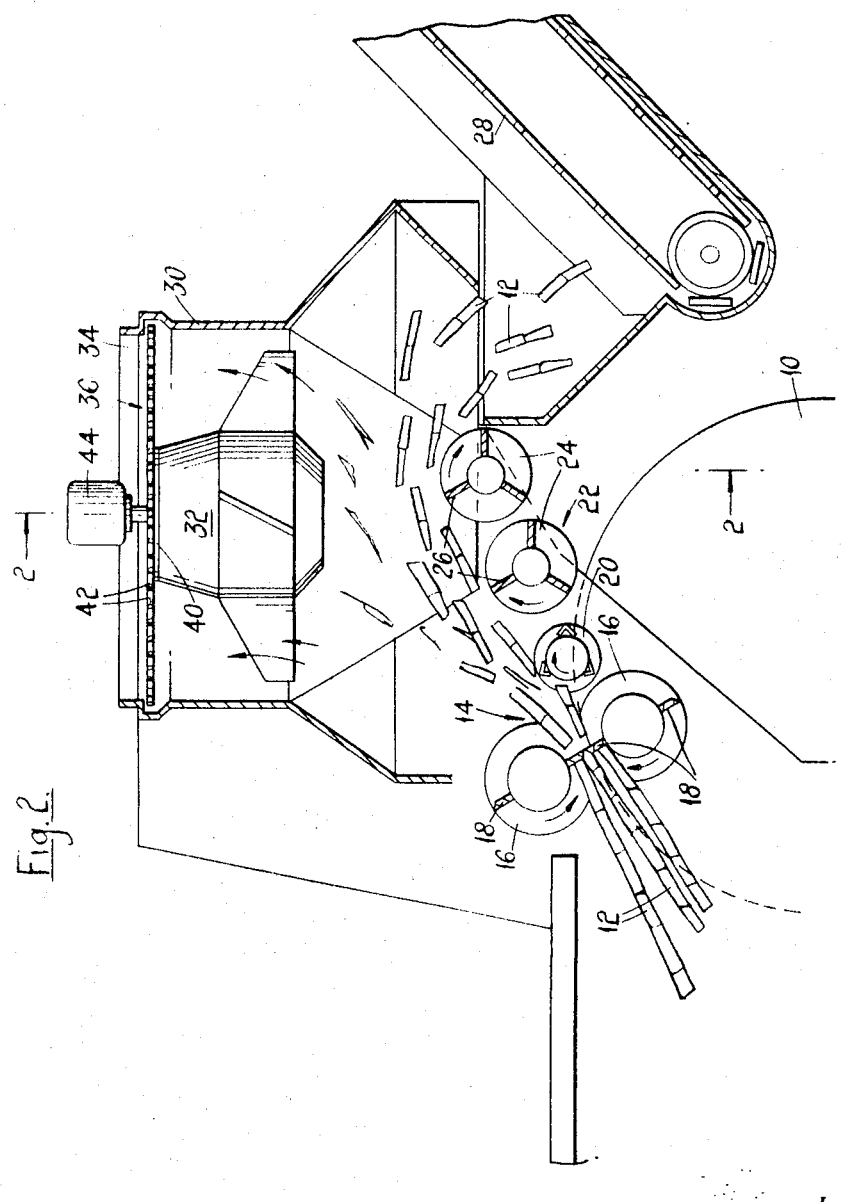

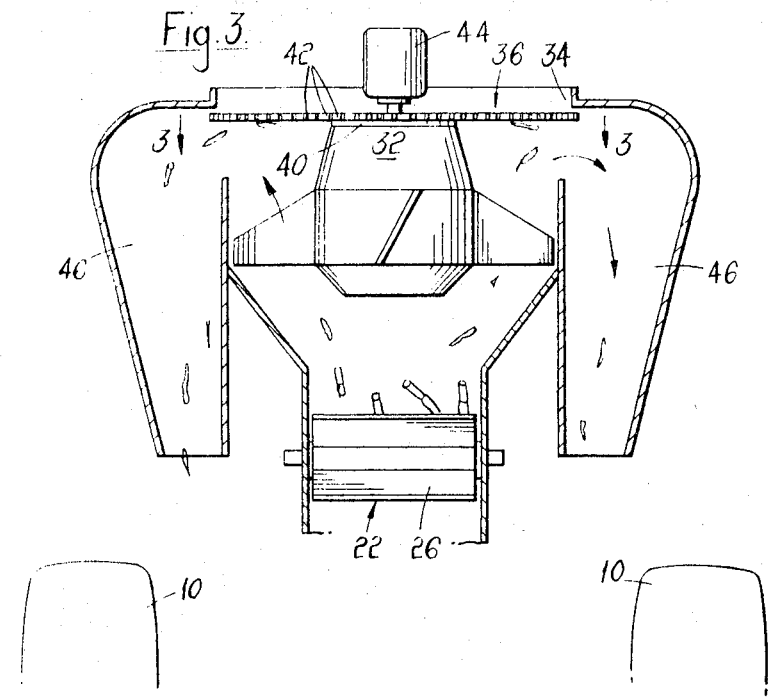
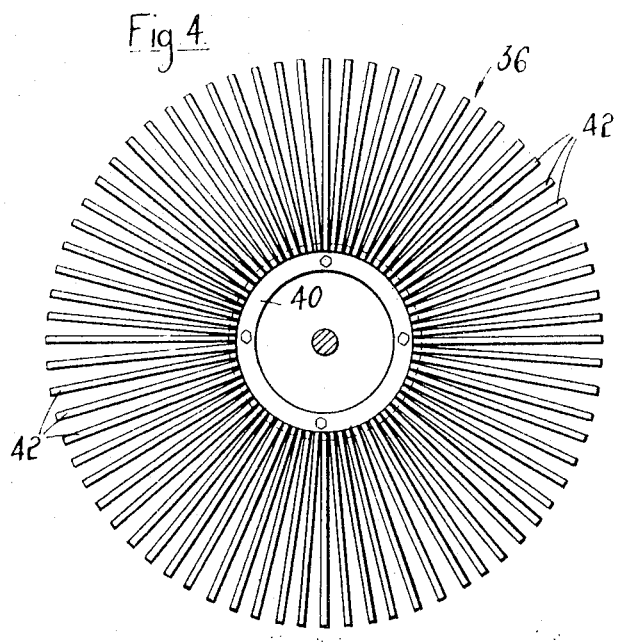

TRASH SEPARATOR FOR SUGAR CANE HARVESTERS

This invention relates to material separation apparatus and more particularly to improved arrangements for the separation and disposal of the trash normally collected with the cane in a sugar cane harvester.

According to the present invention there is provided apparatus for removing relatively light-weight material from an airborne stream containing heavier material, comprising a housing through which the airborne stream is to pass and having an extractor fan for drawing the light-weight material from the airborne stream, an outlet in the housing for the air moved by the fan, and a rotatable element adapted to revolve in the outlet. The rotatable element is permeable to the passage of air and impermeable to the passage of the light-weight material.

Preferably the apparatus is incorporated in a sugar cane harvester.

An embodiment of the present invention will now be described by way of example, with reference to the accompanying drawings, in which:

FIG. 1 is a side view of a sugar cane harvester according to the present invention, FIG. 2 is a fragmentary enlarged cross-sectional view of part of the harvester illustrating the apparatus for removing the chaff, etc., from the chopped cane pieces, FIG. 3 is a cross-sectional view on the line 2—2 of FIG. 2, and FIG. 4 is an enlarged plan view on the spinner on the line 3—3 of FIG. 3.

The sugar cane harvester illustrated in the drawings is mounted on four ground-engaging wheels 10 and is provided with the usual crop topper 9, and crop gathering arms 8, and a base-cutting mechanism from which whole cane sticks 12 are delivered to a chopper 14 comprising a pair of rotatable rollers 16 having cooperating chopping blades 18. The chopped cane is fed to a rotary sill 20 and thereafter to a conveyor 22 comprising a pair of flipper rollers 24, each of which is provided with a number of paddles 26 which contact the cane as the rollers rotate, projecting the cane rearwardly and causing it to become airborne. Relatively light-weight material or trash is removed by apparatus to be described hereinafter and relatively clean pieces of cane are delivered to a conveyor 28, by means of which they are discharged to a cane bin.

Above the conveyor 22 there is mounted a housing or hood 30 in which an extractor fan 32 is rotatably mounted. The fan is arranged to draw air through the cane pieces while they are airborne and to discharge the air so moved through an outlet 34, which is guarded by a rotatable element or spinner 36 one form of which is illustrated in FIG. 4. The spinner 36 is attached to the hub of the fan 32 by means of bolts and rotates with the fan. It consists of a central hub 40 with a plurality of closely-spaced radial spokes 42 attached thereto. In the present instance the spokes have a spacing of approximately 5° giving a total of 72 spokes.

In some cases it may be desirable to divide the spinner approximately along a diameter into two pieces of facilitate installation since it will be noted that in both FIG. 2 and FIG. 3 the spokes of the spinner extend beyond the edge of the outlet 34 and, if the spinner is not made in two parts it would be necessary to remove the casing 30 before the spinner could be installed or removed.

The spinner 36 is illustrated in the drawings as having the ends of its spokes free, but in some cases it may be desirable to have them supported by a peripheral ring to which they may be attached by welding or other suitable means.

A hydraulic motor 44 drives both the fan 32 and the spinner 36 and most of the air drawn through the cane pieces by the fan 32 is discharged through the outlet 34. The entrained trash such as cane leaves and small pieces of cane contact the spokes 42 of the spinner and are prevented from passing out through the outlet 34. The fan 32 imparts a circulatory motion as well as a longitudinal motion to the air and the circulatory motion, in conjunction with the partial blockage of the outlet 34 by the spinner, causes some of the air to pass into downwardly directed chutes 46 located one on each side of the casing 30. The contact of the fan blades with the heavier pieces of trash passing through it causes them to be deflected into the chutes 46, and a combination of centrifugal action and the radial flow of air causes the lighter pieces of trash caught in the spokes of the spinner 36 to move outwardly and drop into the chutes 46. The chutes discharge the trash downwardly between the frame of the harvester and the wheels 10 while relatively trash-free air passes out through the outlet 34.

The air flow in the chutes 46 ensures that their exits will not become blocked by trash, and the velocity of the air flow in the chutes is sufficiently low to ensure that it will not stir up dust as it is discharged.

We claim:

1. An apparatus for removing relatively light-weight material from an airborne stream containing heavier material, comprising a housing through which said airborne stream is to pass, conveyor means mounted in the lower portion of the housing for agitating the stream of material and keeping it airborne, an extractor fan mounted in the housing for drawing air up through the conveyor means and for drawing light-weight material from the airborne stream, a duct connected to the housing for directing air and light-weight material away from the extractor fan, a first outlet from the duct for directing air and light-weight material away from the extractor fan, a rotatable element including a hub and a plurality of spokes extending generally radially from the hub positioned in the duct between the extractor fan and the first outlet from the duct, power means to rotate the rotatable element whereby light-weight material is thrown outwardly by centrifugal action and separated from the air from the extractor fan before it passes through the first outlet, and a inlet to the duct communicating with the housing between the extractor fan and the first outlet for the passage of a portion of the air from the extractor fan and the light-weight material separated from air passing through the first outlet by the rotatable element.

2. Apparatus according to claim 7, wherein the rotatable element and the extractor fan are coaxially mounted and are driven by a single drive motor.

3. The apparatus according to claim 1 wherein the second outlet from the duct includes at least one open ended chute for directing light-weight material away from the apparatus.

* * * * *